United States Patent
Löffler

(10) Patent No.: US 6,591,177 B1
(45) Date of Patent: Jul. 8, 2003

(54) METHOD OF CONTROLLING A CVT AUTOMATIC TRANSMISSION

(75) Inventor: Bernd Löffler, Ravensburg (DE)

(73) Assignee: ZF Batavia, L.L.C., Batavia, OH (US)

( * ) Notice: Subject to any disclaimer, the term of this patent is extended or adjusted under 35 U.S.C. 154(b) by 21 days.

(21) Appl. No.: 09/697,553

(22) Filed: Oct. 26, 2000

(30) Foreign Application Priority Data

Oct. 29, 1999 (DE) .......................................... 199 52 476

(51) Int. Cl.$^7$ .............................................. F16H 61/12
(52) U.S. Cl. ........................ 701/63; 701/62; 477/45; 477/903; 474/18; 474/28
(58) Field of Search ............................ 477/44, 45, 906; 477/903; 701/62, 63, 34; 474/28, 18, 69

(56) References Cited

U.S. PATENT DOCUMENTS

| | | | |
|---|---|---|---|
| 4,393,732 A | * 7/1983 | Suzuki et al. ................ | 477/125 |
| 4,425,621 A | * 1/1984 | Skarvada .................... | 303/168 |
| 4,823,644 A | * 4/1989 | Ohkumo ...................... | 477/44 |
| 5,062,050 A | * 10/1991 | Petzold et al. .............. | 192/3.58 |
| 5,168,778 A | * 12/1992 | Todd et al. .................... | 474/18 |
| 5,315,972 A | * 5/1994 | Judy et al. ............... | 123/198 D |
| 5,366,416 A | * 11/1994 | Roovers et al. ............... | 474/18 |
| 5,515,272 A | * 5/1996 | Sakai et al. .................. | 180/273 |
| 5,617,337 A | * 4/1997 | Eidler et al. ................. | 123/478 |
| 5,707,314 A | * 1/1998 | Kashiwabara et al. ........ | 474/17 |
| 5,720,692 A | * 2/1998 | Kashiwabara ................. | 474/28 |
| 6,050,917 A | * 4/2000 | Gierling et al. ............... | 477/45 |
| 6,224,509 B1 | * 5/2001 | Gierling ....................... | 477/45 |
| 6,243,638 B1 | * 6/2001 | Abo et al. ..................... | 477/45 |

FOREIGN PATENT DOCUMENTS

| | | | |
|---|---|---|---|
| DE | 196 50 218 A1 | 6/1998 | |
| JP | 406213316 A | * 8/1994 | ........... F16H/61/12 |

OTHER PUBLICATIONS

Boos, Manfred and Wolf–Ekkehard Krieg, "Stufenloses Automatikgetriebe Ecotronic von ZF" *ATZ Automobiltechnische Zeitschrift I96* (1994) 6, pp. 378–384.

* cited by examiner

Primary Examiner—Saul Rodriguez
Assistant Examiner—Eric M. Williams
(74) Attorney, Agent, or Firm—Davis & Bujold, P.L.L.C.

(57) ABSTRACT

A method is described for control of a CVT automatic transmission (1) in which a sensed main pressure (p_hd_act) and a sensed contact pressure (p_s2_act) of a secondary pulley (7) are entered as signals in an electronic transmission control (8). For diagnosis of an error in the sensing of the main pressure (p_hd_act) and/or of the contact pressure (p_s2_act) of the secondary pulley (7) their actual values or comparison variable (|p_hd_act-p_hd_nom|, |p_s2_act-p_s2_nom|) formed therefrom are compared with applicable threshold values (p_hd_min, pd_phd_regdiff, p_s2_min, pd_ps2_regdiff) associated with a range of plausible pressure values.

23 Claims, 4 Drawing Sheets

METHOD OF CONTROLLING A CVT AUTOMATIC TRANSMISSION

According to the type defined in more detail in the preamble of Claim 1, the invention concerns a method of controlling a CVT automatic transmission in which an electronic transmission control comprises a main pressure and a contact pressure of a secondary pulley.

Modern automatic transmissions work with an electronic transmission control (EGS) by means of which can be met criteria relevant to information an safety. The electronic transmission control which as a rule communicates with an engine control unit from the transmission motor and side of the vehicle. From the input signal and stored data such as gear shift characteristic lines for gears, tuning parameters for pressure calculation, engine engagement and time steps, the same as regulators and diagnosis parameters, the electronic transmission control calculates the correct gear and optimum pressure curves for gear shifts by means of adequate program modules.

To ensure a correct operation of the automatic transmission, great importance is attached to the reliability of the input signals, since otherwise there is chosen a shifting program not adapted to the operation situation which under circumstances can result in damage to the transmission and dangerous situation in the operation.

In CVT automatic transmissions, together with the rotational speeds of the primary pulley and secondary pulley of the variator, the main pressure and the contact pressure of the secondary pulley which is decisive for the variator's capability of torque transmission, especially constitute important input variables on which the correctness of the transmission control essentially depends.

DE 196 50 218 A1 discloses a method for monitoring the orderly operation of two rotational speed sensors associated with the primary and secondary cone pulley pairs wherein brief failure of the rotation speeds can also be detected and react thereto with adequate flexibility. This is obtained by the fact that in the presence of a stationary state during travel, a ratio of the variator is determined from the rotational speed signals of the primary and secondary pulleys and the ratio is coordinated with a first characteristic field, the characteristic field having a range of admissible and a range of non-admissible ratios. An error is detected when the ratio is in a non-admissible range and with the detection of the error the contact pressure level of the variator is raised in a first step and if the presence of the error persists, an emergency drive program is activated in a second step.

While with the method known already, a monitoring of the signals delivered by the rotational speed sensors is possible, the verification of the signals issued by the pressure sensors to the electronic transmission control is unsatisfactory.

In the practice, two sensors are provided for pressure monitoring, namely, one sensor after a main-pressure supply pump and one sensor on the secondary pulley or hydraulic chamber thereof.

When the sensors or the current regulators thereof are defective, erroneous pressure values are issued. The same applies when a failure occurs in the pressure preparation, e.g. in case of a mechanical defect in the transmission. Even though in that case, the pressure values can lie outside a tolerance range, the sensing of the electronic transmission control is not detected as defect so that an incorrect adaption is effected in that case.

The problem, on which this invention is based, is to make available a method for control of a CVT automatic transmission in which an electronic transmission control comprises a main pressure and a contact pressure of a secondary pulley, the pressure values being verified as to plausibility.

SUMMARY OF THE INVENTION

The inventive method offers the advantage that in the sensing of the main pressure and of the contact pressure of the secondary pulley of the variator failures can be reliably detected so that further processing of non-plausible pressure values can be prevented.

Since for reasons of consumption an objective of the control of the CVT automatic transmission consists in keeping the pressure level as high as needed but as low as possible, the inventive method makes it possible to implement a transmission control optimized in terms of consumption and with which is prevented a pressure availability too high on account of an error in the pressure sensing.

Besides, it is possible with the inventive method advantageously to ensure that seriously erroneous pressure values cannot lead to any control of the CVT automatic transmission that can damage the automatic transmission or impair the stability of the vehicle.

BRIEF DESCRIPTION OF THE DRAWINGS

Other advantages and developments of the invention result from the embodiments described in principle herebelow with reference to the drawings. In the drawings.

DESCRIPTION OF THE PREFERRED EMBODIMENTS

Figure 1:
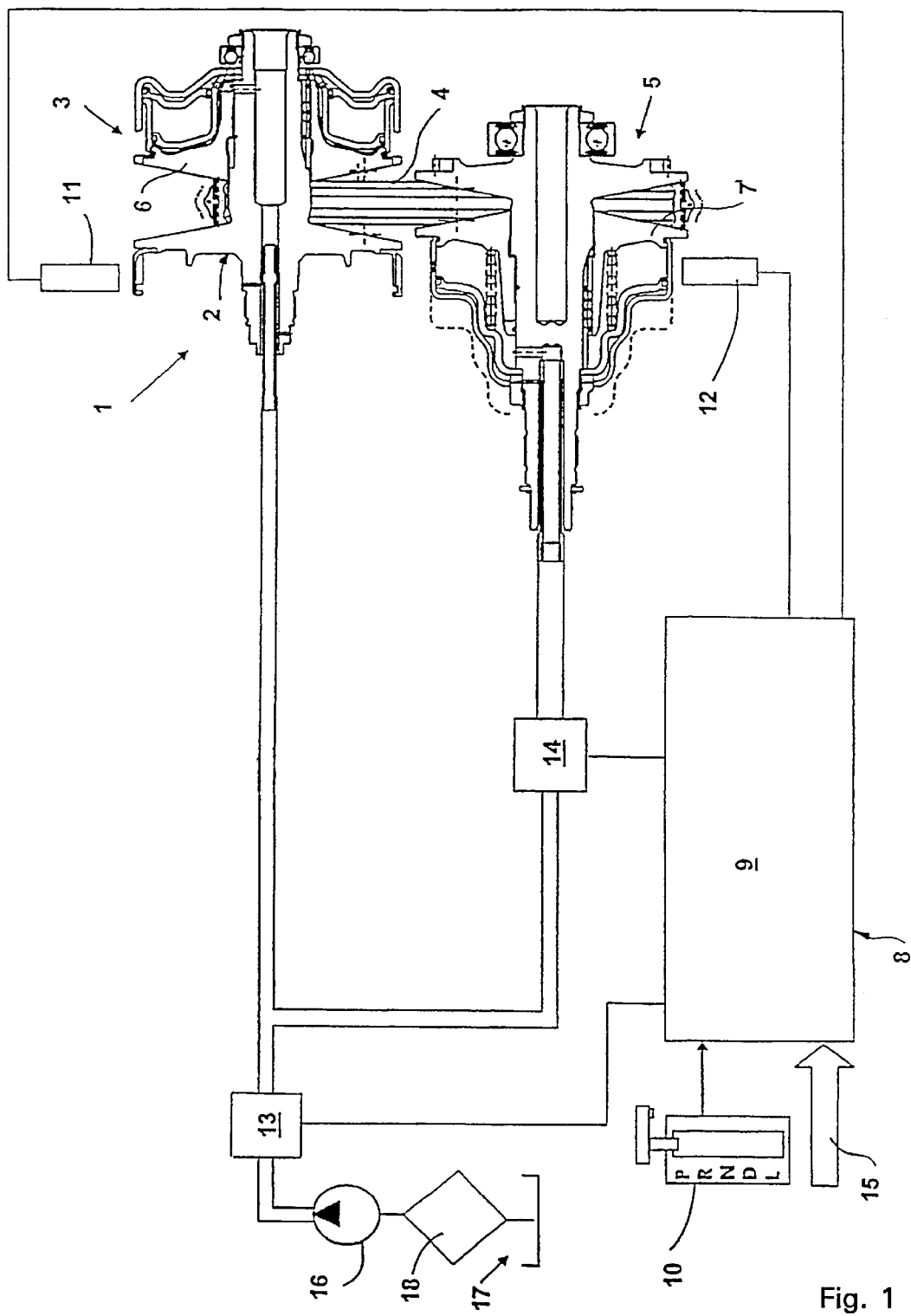
FIG. 1 is a simplified system diagram of a CVT automatic transmission.

Referring to FIG. 1, it shows an extensively simplified diagram of a CVT automatic transmission of a design known per se such as has been described in ATZ Automobiltechnische Zeitschrift 96 (1994), page 380. Here can be seen a variator 2 having situated on the input side a cone pulley pair 3, a belt-drive organ 4 and a second cone pulley pair 5 situated on the output side. Both the primary cone pulley pair 3 and the secondary cone pulley pair 5 consist of a primary pulley 6 stationary in axial direction and a secondary pulley 7 movable in axial direction by pressure actuation. The running radius of the belt-drive organ 4 and, therefore, also the ratio is determined by the axial position of the movable primary pulley 6 or secondary pulley 7, respectively.

An electronic transmission control (EGS) 8 having an electronic control unit 9 receives signals, among others, from a selector lever 10, a rotational speed sensor 11 of primary pulley 6, a rotational speed sensor 12 of secondary pulley 7, a main pressure sensor 13, a secondary pulley pressure sensor 14 and other signal transmitters symbolically shown with an arrow 15. The electronic control unit 9 determines from the input variables operation parameters of the automatic transmission 1 such as a ratio, an operating point and a pressure level in the primary and secondary pulleys.

The sensors 13, 14 for detecting a main pressure p_shd and a contact pressure p_ss2 on the secondary pulley, which pressures determine the contact between belt-drive organ 4 and secondary cone pulley pair 5 and thus the capability for torque transmission of the system, constitute a unit with the electromagnetic pressure regulators. The pressure of the pressure regulators 13 and 14 is supplied by a main pressure delivery pump 16 which conveys the hydraulic medium from an oil sump 7 via a filter 18.

The pressure values issued by the pressure sensors 13, 14 to the electronic transmission control 9 are tested for plausibility by means of a program module in the electronic control unit 9.

To this end, two different inquiries are made in which are tested for each pressure sensed a nominal-actual pressure difference |p_hd_act-p hd_nom| or |p_s2_act-p_s2_nom| and an adaptation or regulation with which it is sought to equate the actual pressure and the nominal pressure.

Figure 2:
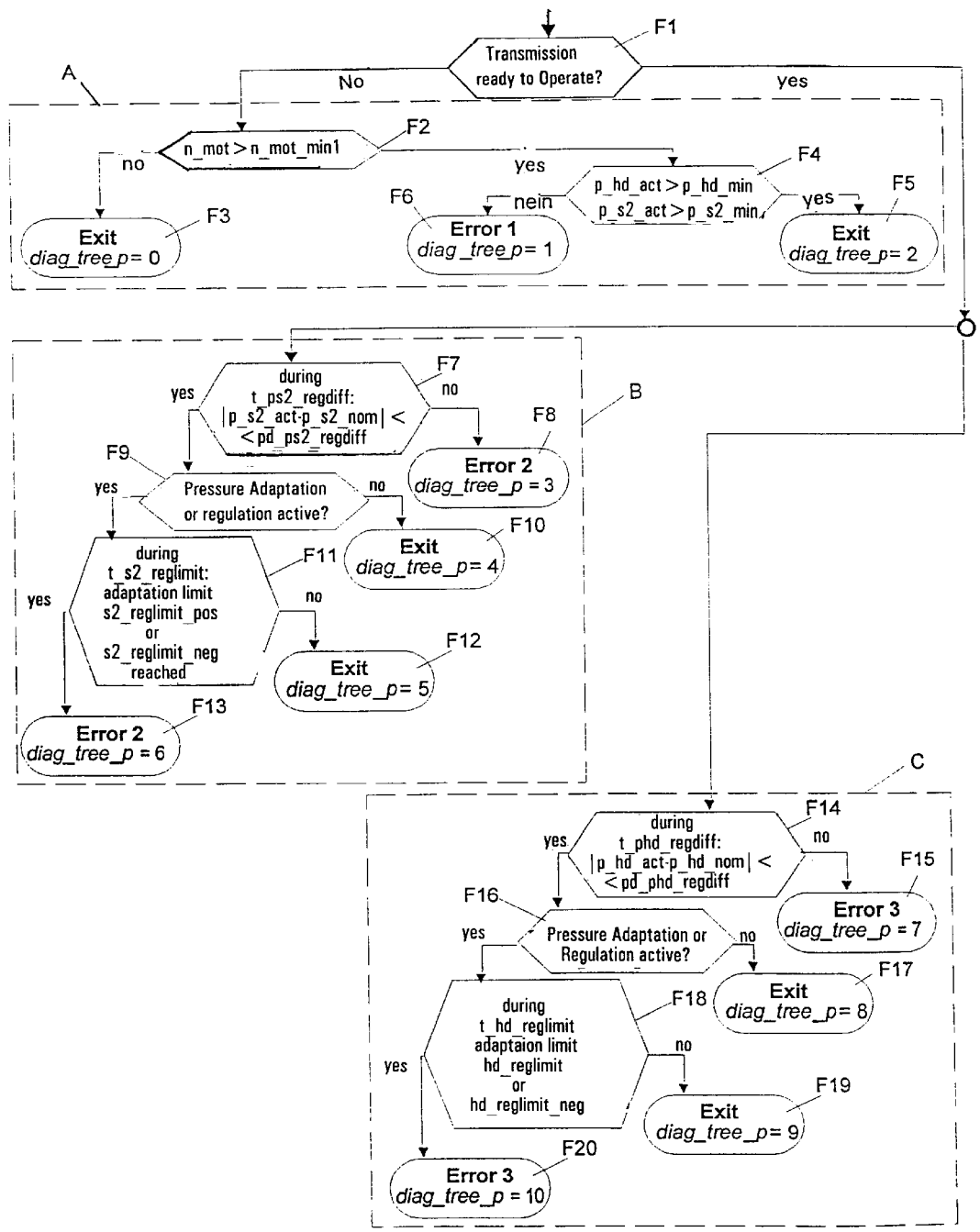
FIG. 2 is a flow chart of a program module for parallel testing of a sensed main pressure and of a sensed secondary pulley pressure.
Figure 3:
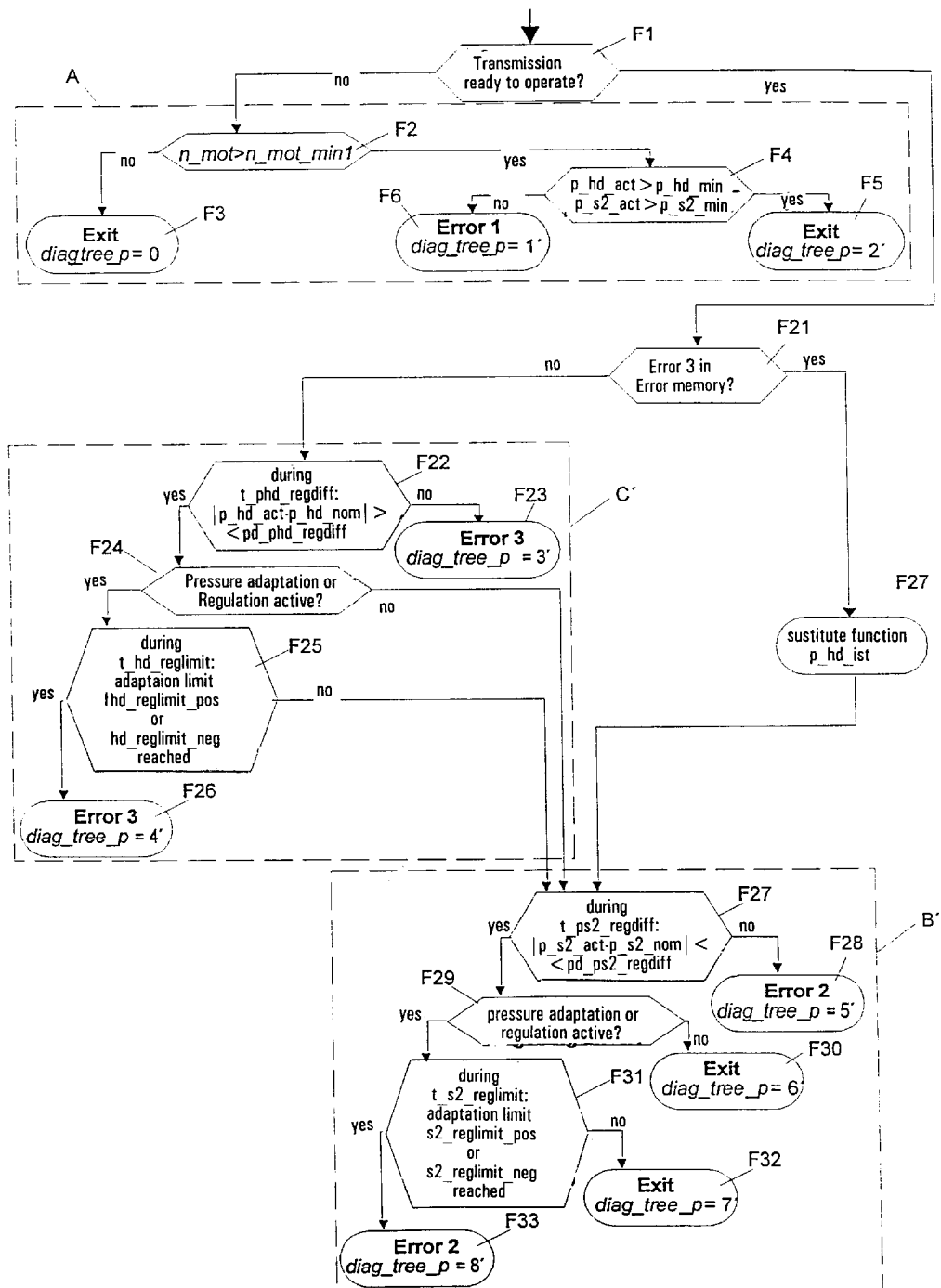
FIG. 3 is a flow chart of one other program module for serial testing of the sensed pressures with parallel monitoring and adaption of the pressures.
Figure 4:
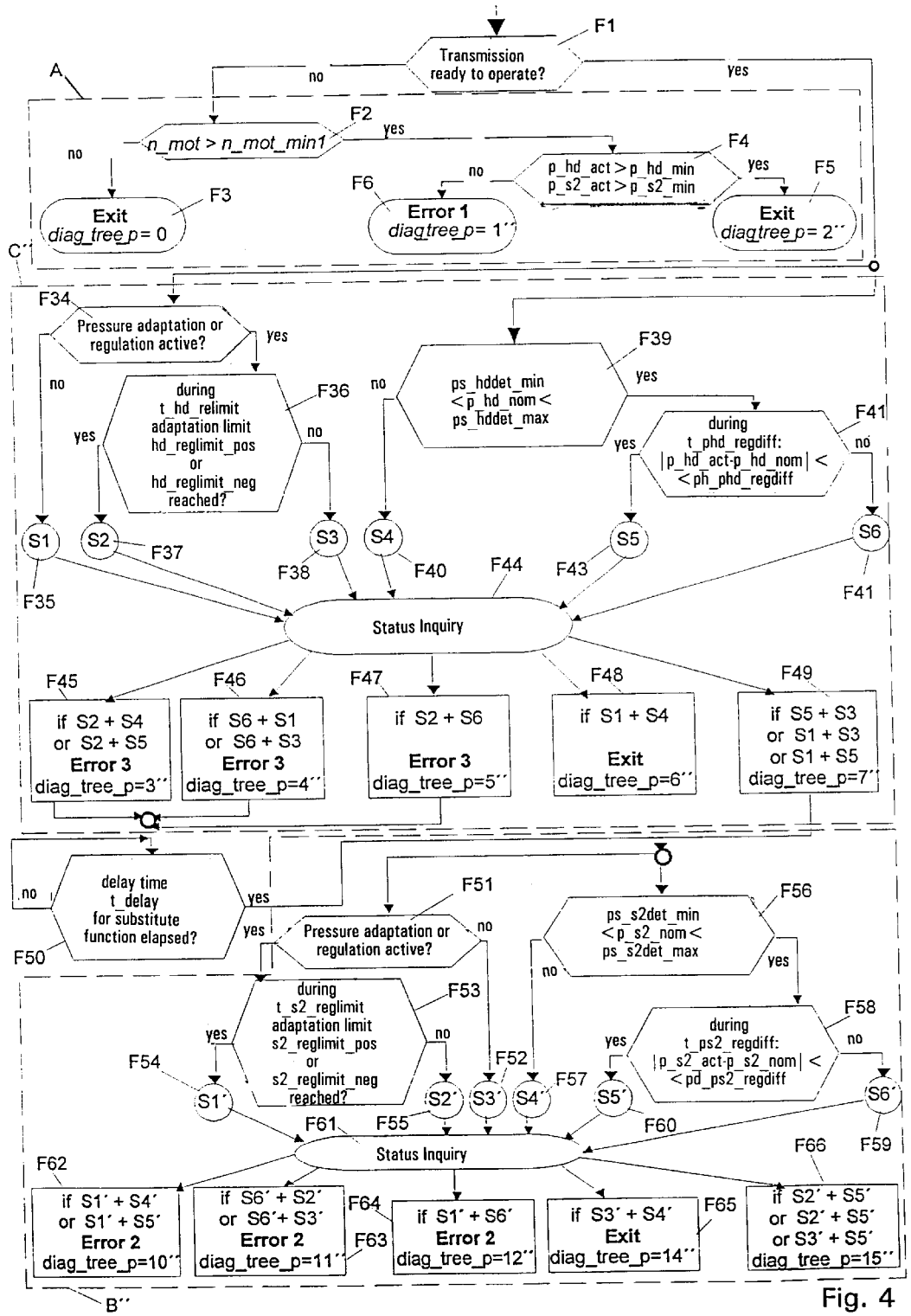
FIG. 4 is a flow chart of one other program module for serial testing of the sensed pressures with parallel monitoring of an adaptation of the pressures.

FIG. 2 to FIG. 4 show each a flow chart of a program module for monitoring the pressure sensory analysis of the CVT automatic transmission 1, wherein are carried out in FIG. 2 a parallel test of the sensed pressure, namely, of the contact pressure p_s2_act on the secondary pulley 7 and of the main pressure p_hd_act, in FIG. 3 a serial test of the sensed pressures and in FIG. 4, a serial test for plausibility of the sensed pressures with parallel monitoring of the adaptation in the electronic transmission control 8.

At the beginning, in each program module is verified in a function F1 whether the automatic transmission is ready for operation, i.e. that an ignition has been engaged, that the engine speed has been self-adjusted after starting the engine and that the oil pressures in the transmission have reached a height which ensures sufficient operation of the transmission. As long as no readiness for operation is detected, it is tested, starting from a minimum engine rotational speed n_mot_min 1, whether a minimum pressure level p_hd_min and p_s2_min have at all been reached on both pressure branches.

Otherwise, it is assumed that a defect exist in the oil supply. If the transmission is not ready to operate and thus sufficient oil supply is not ensured, the automatic transmission still is not ready to move. Thus no verification for plausibility of the sensed pressures has significance.

When in the F1 function, no readiness for operation of the automatic transmission is detected, in a program part A is checked whether there has been a regular pressure buildup after start of the motor.

For this purpose in a function F2 is tested whether the motor rotational speed n_mot is higher than an applicable threshold value for a minimum motor rotational speed n_mot_min 1.

When the result of the inquiry in the function F2 is negative, i.e. the motor rotational speed n_mot is below the minimum value for the motion of the motor starting from which, in spite of correct transmission operation, no oil pressure can build up, the diagnosis is discontinued and a function F3 is activated for abandoning (exit) the diagnosis.

Simultaneously, a position information diag_tree_p=0 is issued. With each possible exit from the program is associated one such position information with which the actual position in the program module can be monitored on an adequate indicator. In this way can easily be established which inquiry has precisely been carried out in the program module.

Since in different possibilities of exit from the program module, the function to abandon (exit) or one and the same error notice is possible, the position information allows the precise coordination of an exit or error information with an inquiry so that the event that has occurred can be exactly diagnosed and an error with its position can be stored in the error memory. The position information in addition simplifies the adjustment and analysis of the existing function or condition thereof.

When in the function F2 is detected that the motor rotational speed n_mot is higher than the threshold n_mot_min 1, in a function F4 is tested whether the sensed main pressure p_hd_act is higher than a threshold value p_hd_min associated there with and the contact pressure p_s2_act on the secondary pulley 7 is higher than the threshold value p_s2_min associated therewith.

When the result of the inquiry of the function F4 delivers that the sensed pressures p_hd_act and p_s2_act are higher than the respective threshold values, an "exit" function F5 to abandon the diagnosis is activated on a position diag_tree p=2. Otherwise, that is, when at least one of the sensed pressures p_hd_act and p_s2_act is below the threshold value associated therewith, in a function F6 is issued an error "error 1" associated with this situation in which the main pressure p_shd has not correctly built up at the start of the motor, and the error with the position information diag_tree_p=1 is stored in the error memory.

When returning to the program module of FIG. 2 for function F1 and the development of the method is observed for the case that in the function F1 a readiness for operation of the automatic transmission has been detected, there follows in this embodiment a parallel inquiry of the sensed pressures p hd act and p_s2_act. To this end, a program part B is branched off to for inquiry of the contact pressure p_s2_act on the secondary pulley and the program part C is branched off to for inquiry of the main pressure p_hd_act.

If the program part B is first observed for inquiry of contact pressure p_s2_act, in a function F7 there is monitored, during applicable time t_ps2_regdiff which constitutes a local filtering time, the nominal-actual pressure difference |p_s2_act-p_s2_nom| on the secondary pulley 7 to see whether it exceeds an applicable threshold value of pressure differences pd_ps2_regdiff, which at present amounts to 6 bar. When the function F7 delivers the result that the nominal-actual pressure differences |p_s2_act-p_s2_nom| on the secondary pulley 7 is not lower than the threshold value pd_ps2_regdiff, in a subsequent function F8 a defined error notice "error 2" is issued in the program module for an error in the pressure sensing on the secondary pulley 7, here for too great a pressure difference on a position diag_tree_p=3.

When the nominal-actual pressure difference |p_s2_act-p_s2_nom| on the secondary pulley 7 still is admissible, it is tested in a function F9 whether a pressure adaptation or regulation for equating the actual pressure p_s2_act with the nominal pressure p_s2_nom of the secondary pulley is active. If this not the case, the diagnosis tree is exited from in a subsequent function F10 and the program module is abandoned in a position diag_tree_p=4.

When, like in the instant case, a pressure adaptation or pressure regulation has been provided and in the function F9 is detected as active, it is tested in another function F11 whether the pressure adaptation or regulation has reached in an applicable time t_s2_reglimit a defined upper adaptation or regulation limit s2_reglimit_pos or a lower adaptation or regulation limit s2_reglimit_neg.

The pressure adaptation is conducted via a current i_s2 passed to the pressure regulator 14 of the secondary pulley 7. The intensity of the current is associated via a characteristic line with a required pressure on the pressure regulator 14. Here is provided an offset band surrounding the characteristic line of +/−50 mA in this case, which is limited by the upper adaptation or regulation limit s2_reglimit_pos and the lower adaptation or regulation limit s2_reglimit_neg. Within the offset band changes of intensity of the current are admissible for adapting the current.

For equation of the actual pressure p_s2_act or p_hd_act with the appertaining nominal pressure p_s2_nom or p_hd_nom, both an adaptation and a regulation are conceivable.

When neither the upper nor the lower adaptation limits are detected as having been reached, in one other "exit" function F12 the program module is abandoned on a position diag_tree_p=5.

However, in case the upper or the lower adaptation or regulation limit has been reached, in a function F13 the error notice "error 2" is issued for too great a pressure difference on the secondary pulley 7 and recorded in the error memory with a position diag_tree_p=6.

Similarly to the program part B for inquiring the contact pressure p_s2_act is configurated the program part C for inquiring the main pressure p_hd_act which runs parallel therewith.

Thus, in a function F14, during an applicable local filtering time t_phd_regdiff, the nominal-actual pressure difference |p_hd_act-p_hd_nom| of the main pressure is first examined as to whether it exceeds an applicable threshold value of pressure difference pd_phd_regdiff. When the result delivered by the function F14 is that the nominal-actual pressure difference |p_hd_act-p_hd_nom| of the main pressure is not lower than the threshold value pd_phd_regdiff, in a subsequent function F15 a defined error notice "error 3" on a position diag_tree_p=7 is issued for an error in the pressure sensing of the main pressure, here for too great a pressure difference, and recorded in the error memory.

When the nominal-actual pressure difference |p_hd_act-p_hd_nom| of the main pressure still is admissible, in a function F16 is tested whether a pressure adaptation or regulation for equating the actual pressure p_hd_act with the nominal pressure p_hd_nom of the main pressure supply is active. If this is not the case, in a subsequent function F17 the diagnosis tree is abandoned and the program module left on a position diag_tree_p=8.

In case a pressure adaptation or regulation has been detected in the function F16 as active, in another function F18 is tested whether the pressure adaptation or regulation has reached, in an applicable time t_hd_reglimit, a predetermined upper adaptation or regulation limit hd_reglimit_pos or lower adaptation or regulation limit hd_reglimit_neg. The adaptation limit, in turn, form here an upper and lower edge of an offset band around a characteristic line in which a current intensity is stored for control of the main pressure regulator 13 depending on a required main pressure.

When neither the upper nor the lower adaptation or regulation limit is detected as having been reached, i.e. the variation of the current of the pressure regulator 13 for the main pressure p_shd moves within the offset band or within the regulation limits, in another "exit" function F19, the program module is left on a position diag_tree_p=9, returning here, the same as in every other exit, from the program module back to the beginning thereof.

However, if the upper or the lower adaptation or regulation limit hd_regdiff_pos or hd_reglimit_neg is reached, in a function F20 the error notice "error 3" is issued for too great a pressure difference of the sensed main pressure and is retained in the error memory with a position diag_tree_p=10 so that it can be verified with the aid of an error printout that there is an error in the pressure sensing of the main pressure on account of an adaptation or regulation limit having been reached.

In FIG. 3 is shown a program module for monitoring the pressure sensory analysis in which for the case that the transmission is not ready to operate a program part A is run through like in FIG. 2. But when in the function F1 a readiness to operate of the transmission has been detected, then follows here a serial inquiry of the sensed pressures p_hd_act and p_s2_nom, there being first tested for plausibility the sensed main pressure p_hd_act in a program part C' and, optionally thereafter, the sensed contact pressure p_s2_act on the secondary pulley in a program part B'.

With the prioritization of the main pressure p_hd_act, it is advantageously taken into account that the contact pressure p_s2_act on the secondary pulley 7 depends on the supply with the main pressure p_hd_act so that an eventual detection of error in the sensing of the main pressure p_hd_act is taken into account when examining the contact pressure p_s2_act on the secondary pulley.

For the sake of clarity, the position information is provided with an apostrophe in the program module of FIG. 3.

When in the function F1 a readiness for operation of the automatic transmission is detected, in a subsequent function F21 is inquired whether the error "error 3", i.e. an error in the sensing of the main pressure p_hd_act, had already been detected in a previous run through of the program and stored in the error memory.

In case of negative result of the inquiry, i.e. no error "error 3" has been stored in the error memory, the main pressure in the program part C' is inquired. The construction of the program part C' essentially corresponds to that of the program part C in FIG. 2.

At the same time in a function F22 corresponding to the function F14 in FIG. 2, during the applicable time t_phd_regdiff, the nominal-actual pressure difference |p_hd_act-p_hd_nom| of the main pressure is first examined as to whether it is less than the applicable threshold value of pressure difference pd_phd_regdiff. In case of negative result of the inquiry, in a subsequent function F23, the error notice "error 3" provided for an error in the pressure sensing of the main pressure is issued with a position information diag_tree_p=3' and is recorded in the error memory.

When the nominal-actual pressure difference |p_hd_act-p_hd_nom| of the main pressure is still admissible, in a function F24 is tested whether a pressure adaptation or regulation is active. If this is not the case, the program part B' is branched off to for inquiring the contact pressure p_s2_act on the secondary pulley.

In case a pressure adaptation or regulation is detected as active in the function F24, it is tested in another function F25 corresponding to the function F18 in FIG. 2 whether the pressure adaptation or regulation, in an applied time t_hd_reglimit has reached the upper adaptation limit hd_reglimit_pos or the lower adaptation or regulation limit hd_reglimit_neg.

If it is found that the adaptation or regulation occurs within the limits, the program part B' is branched off to for inquiry of the contact pressure p_s2_act on the secondary pulley. But if the upper or the lower adaptation or regulation limit hd_reglimit_pos or hd_reglimit_neg has been reached, then in a function F26 the error notice "error 3" is issued and retained in the error memory with a position indication diag_tree_p=4.

When the result delivered to the inquiry in the function F21 is that an error already exists in the sensing of the main pressure p_hd_act in the error memory, without inquiring the main pressure p_hd_act the program part B' is directly branched off to for inquiry of the contact pressure p_s2_act on the secondary pulley, a substitute function F27 being first activated. This defines that the main pressure p_hd_act is correct, a sensor defect being accordingly assumed.

Thereafter is started the program part B' which in its construction essentially corresponds to the program part B in FIG. 2. Thus, in a function F27 corresponding to the function F7 in FIG. 2, it is first tested during a filtering time t_phd_regdiff whether the nominal-actual pressure difference |p_s2_act-p_s2_nom| on the secondary pulley is lower than the applicable threshold value of pressure difference pd_ps2_regdiff. In case of negative result of the inquiry, in a subsequent function F28, the error notice "error 2", defined for an error in the pressure sensing of the secondary pulley on a position diag_tree_p=5', is issued and recorded in the error memory.

If the nominal-actual pressure difference |p_s2_act-p_s2_nom| on the secondary pulley still is admissible, in a function F29 is inquired whether a pressure adaptation or regulation is active. If this is not the case, in a subsequent function F30 the program module is abandoned on a position diag_tree_p=6'. In case a pressure adaptation or regulation has been detected as active, it is tested in another function F31 corresponding to the function F11 in FIG. 2 whether the pressure adaptation or regulation, in the applicable time t_s2_reglimit, has reached its upper adaptation or regulation limit s2_reglimit_pos or its lower adaptation or regulation limit s2_reglimit_neg.

When the variation of the current of the pressure regulator 14 for the secondary pulley pressure p_s2_act moves within the adaptation or regulation limits, the program module is abandoned in an "exit" function F32 on a position diag_tree p=7', returning back to its beginning. But if the upper or the lower adaptation or regulation limit, respectively s2_reglimit_pos or s2_reglimit_neg, is reached, then in a function F33 the error notice "error 2" is issued for too great a pressure difference of the sensed secondary pulley pressure and retained in the error memory with a position diag_tree_p=8'.

FIG. 4 shows one other program module for monitoring the pressure analysis wherein, after ascertaining in the function F1 that the automatic transmission is ready for operation, parallel with the inquiry of the sensed main pressure p_hd_act and of the contact pressure p_s2_act on the secondary pulley regarding the observance of the respectively admissible actual-nominal pressure difference, the monitoring of the adaptation or regulation limits for the adaptation or regulation of the pressures is carried out.

In this manner a very advantageous saving of time can be obtained when running through the program module. The working off of the program module according to FIG. 4 also proves itself to be particularly quick since, as in the embodiment of FIG. 3, a prioritization of the inquiry of the main pressure p_hd_act has been effected. Thus, an unnecessary working off of the program part for monitoring the secondary pulley pressure p_s2_act in case of a main pressure problem can be omitted or, when error has already been detected in the sensing of the main pressure p_hd_act, it can be ensured by a delay time that the secondary pressure p_s2_act be again enquired only when a substitute function for the main pressure p_hd_act has stabilized and thus an error detection in the secondary pulley pressure p_s2_act resulting from a main pressure error can be ruled out.

The sequence of the program module in FIG. 4 shows that in automatic transmissions not ready for operation like in the embodiments of FIG. 2 and FIG. 3, the program part A is passed through. But when readiness for operation is detected, first the sensed main pressure p_hd_act in a program part C" and, if necessary thereafter, the sensed contact pressure p_s2_act on the secondary pulley in a program part B" are tested for plausibility.

For the sake of clarity, the position information in the program module of FIG. 4 is provided with a double apostrophe.

As is seen in FIG. 4, in the program part C" is tested, for inquiry regarding a main pressure error in a function F34 corresponding to the function F24 in FIG. 3, whether a pressure adaptation or regulation is active. In case of negative result of the inquiry, in a function F35 is issued a status S1 leading to the abandonment of the program module and in case of positive result of the inquiry, in a function F36 is inquired whether the local filtering time t_hd_reglimit has reached the upper adaptation or regulation limit hd_reglimit_pos or the lower adaptation or regulation limit hd_reglimit_neg. Insofar as the adaptation or regulation is longer than the filtering time t_hd_reglimit on one of the stops mentioned, in a function F37 a status S2 is set which leads to an error detection. But when the adaptation or regulation during the filtering time t_hd_reglimit has been carried out within the adaptation or regulation limits, a status S3 is issued in a function F38.

Parallel with this, in a function F39 is inquired whether the nominal main pressure p_hd_nom lies between a lower detection limit ps_hddet_min and an upper detection limit ps_hddet_max of the main pressure sensor 13.

Since the main pressure sensor 13 detects only the value of the detection limit, which in the upper can here amount, e.g. to 40 bar, as long as the real main pressure is above or below the detection limits, there already results in an existing nominal main pressure p_hd_nom a nominal-actual pressure difference so that the diagnosis must be cut off when exceeding or falling below the detection limits. For this case a status S4 is issued in a subsequent function F40.

When the nominal main pressure p_hd_nom is between the detection limits of the main pressure sensor 13, in another function F41 corresponding to the function F22 in FIG. 3, an inquiry is started as to whether during the local filtering time t_phd_regdiff the nominal-actual pressure difference p_hd_act-p_hd_nom of the main pressure lies within the applicable threshold value of pressure difference pd_phd_regdiff.

Insofar as the threshold value of pressure difference pd_phd_regdiff is exceeded longer than the filtering time t_phd_regdiff, in a function F42 is set a status S6 leading to an error notice. Otherwise, when the threshold value of the pressure difference pd_phd_regdiff has not been exceeded, a status S5 is issued in a function F43.

In a function F44 for inquiring the status, the status information of the functions F35 to F38 and F40 to F43 are compared.

When the status S2 and S4 are present, i.e. an adaptation or regulation limit and the detection limit of the main pressure sensor have been exceeded, or when status S2 and S5 are present, i.e. an adaptation or regulation limit has been exceeded and the threshold value of the pressure difference pd_phd_regdiff has not been exceeded, the error notice "error 3" is issued in a function F45 with a position information diag_tree_p=3".

In case the status S6 and S1 are present, i.e. the threshold value of pressure difference pd_phd_regdiff has been exceeded and no pressure adaptation or regulation has been detected as active, or when status S6 and S3 are present, i.e. the threshold value of the pressure difference pd_phd_regdiff has been exceeded and the adaptation or regulation during the filtering time t_hd_reglimit has been carried out within the adaptation or regulation limit, the error notice "error 3" with a position diag_tree_p=4" is retained in a function F46.

When the status S2 and S6 are present, i.e. one of the adaptation or regulation limits and the threshold value of the pressure difference pd_phd_regdiff have been exceeded, then the error notice "error 3" with a position information diag-tree_p=5" is recorded in the error memory in a function F47.

When on the contrary status S1 and S4 are present, i.e. no pressure adaptation or regulation has been detected as active and the detection limit of the main pressure sensor has been exceeded, an "exit" function F48 for leaving the program module is activated in a position diag_tree_p=6", since a branching off to inquire the secondary pulley pressure is not important.

When in a function F49 on a position diag_tree_p=7", it is detected that status S5 and S3 are present, i.e. the threshold value of the pressure difference pd_phd_regdiff and the adaptation or regulation limits have not been exceeded, or that status S1 and S5 are present, i.e. no pressure adaptation or regulation is active and the threshold value of the pressure difference pd_phd_regdiff has not been exceeded, then the sensing of the main pressure is detected as being in order. After assurance of the main pressure readiness, the program module B" can be started to inquire the secondary pulley pressure.

The transition from the program part C" for monitoring the main pressure sensing to the program part B" for monitoring the pressure sensing of the secondary pulley, after diagnosis of an error and appearance of the error notice "error 3" in one of the functions F45, F46, F47 is delayed in a subsequent function F50 by a delay time t_delay to ensure the building up of a substitute function for the main pressure p_shd.

The possibility, when monitoring the secondary pulley pressure sensing in the program part B", of a sequence of errors resulting from lack of readiness of the main pressure is therewith prevented. The delay time t_delay is to be applied and it amounts to 1000 ms in this case.

With the start of the substitute function, the pressure value delivered by the main pressure sensor is ignored, since it is not plausible. Instead of this, the main pressure is purely controlled without adaptation or regulation, the control being carried out according to a predefined characteristic line loaded with a safety offset in which a current intensity of the pressure regulator is associated with a nominal main pressure.

As soon as the substitute function is started, the delay time begins to run. When the substitute function is reset, i.e. when the detected error no longer exists, the delay time is also reset.

When the function F50 delivers the result that the delay time has elapsed, the program part B", which is essentially configured like the program part C", is branched off to for monitoring the sensing of the secondary pulley pressure.

At the same time, in a function F51 is first tested whether a pressure adaptation or regulation is active. If the result of the inquiry is negative, in a function F52 a status S3' is issued and if the result is positive, in a function F53 is inquired whether during the local filtering time t_s2_reglimit the upper adaptation or regulation limit s2_reglimit_pos or the lower adaptation limit s2_reglimit_neg has been reached. When the latter is the case, in a function F54 a status S1' is set which leads to an error detection. But if the adaptation or regulation during the filtering time t_s2_reglimit remains within the adaptation or regulation limits, a status s2' is issued in a function F55.

Parallel herewith in a function F56 is inquired whether the nominal contact pressure p_s2_nom on the secondary pulley 7 lies between a lower detection limit ps_s2det_min and an upper detection limit ps_s2det_max of the secondary pulley pressure sensor. If the result of the inquiry is negative, i.e. the detection limits have been exceeded or fallen below, the diagnosis is discontinued and a status 84' is issued in a subsequent function F57.

When the nominal contact pressure p_s2_nom on the secondary pulley is between the detection limits of the secondary pulley pressure sensor, in another function F58 is inquired whether during the local filtering time t_ps2_regdiff the actual-nominal pressure difference lies within the applicable threshold value of the pressure difference pd_ps2_regdiff.

If the result of the inquiry is negative, i.e. the threshold value of the pressure difference pd_ps2_regdiff has been exceeded during the filtering time t_ps2_regdiff, in a function F59 is set a status S6' leading to an error notice. Otherwise, when the threshold value of the pressure difference pd_ps2_regdiff has not been exceeded, a status S5' is issued in a function F60.

The status issuances of the functions F52, F54, F55 and F57 to F60 are issued to a function F61 for status inquiry and are there compared.

When status S1' and S4' are present, i.e. an adaptation or regulation limit and the detection limit of the sensor of the secondary pulley pressure have been exceeded, or when status S1' and S5' are present, i.e. an adaptation or regulation limit have been exceeded and the threshold value of the pressure difference pd_ps2_regdiff has not been exceeded, the error notice "error 2" is issued with the position information diag_tree_p=10" in a function F62.

In case the status S6' and S2' are present, i.e. the threshold value of the pressure difference pd_ps2_regdiff has been exceeded and the adaptation or regulation has been carried out within the adaptation or regulation limits, or when status S6' and S3' are present, i.e. an inadmissible nominal-actual pressure difference and no pressure adaptation or regulation have been detected, the error notice "error 2" is retained with a position information diag_tree_p=11" in a function F63.

When status S1' and S6' are present, i.e. an adaptation or regulation limit and the threshold value of the pressure difference pd_ps2_regdiff have been exceeded, the error notice "error 2" is likewise recorded in the error memory with a position information diag_tree_p=12" in a function F64.

If on the contrary status S3' and S4' are present, i.e. no pressure adaptation or regulation has been detected and the detection limit of the sensor of the secondary pulley pressure has been exceeded, an "exit" function F65 for leaving the program module is activated on a position diag_tree_p=14", returning back to the beginning of the program module.

When in a function F66 is detected in a position diag_tree_p=15" that status S3' and S2' are present, i.e. no pressure adaptation or regulation is active and thus also no adaptation or regulation limit has been exceeded, or that status S2' and S5' are present, i.e. the adaptation or regulation limit and the threshold value of pressure difference pd_ps2_regdiff has not been exceeded, or that status S3' and S5' are present, i.e. no pressure adaptation or regulation is active and the threshold value of pressure difference pd_ps2_regdiff has not been exceeded, the pressure sensing of the contact pressure on the secondary pulley is detected as being in order and the beginning of the program module is returned to.

Thus it is concluded that the pressure value sensed is not plausible whenever one of the errors "error 1", "error 2", "error 3" has been detected. A reaction to this can be that the pressure adaptation or regulation be deactivated to prevent that the erroneous adaptation or regulation and an actual-nominal pressure difference possibly be further increased. After deactivation of the pressure adaptation or regulation, the pressure regulator is purely operated, the controlled pressure being loaded with an additional safety value.

In these embodiments, it has been provided that in case of an error detection in the pressure sensing, such as the detection of an inadmissible ratio, the contact pressure level of the variator is increased with reference to rotational speeds of the cone pulley pairs 3, 4 by an added program module of the electronic transmission control 8 and if the error persists that an emergency drive program be activated in another step.

In embodiments differing from these, other adequate consequences can obviously be drawn from the error detection in the pressure sensing.

Reference numerals

1 cvt automatic transmission
2 variator
3 primary cone pulley pair
4 belt-drive organ
5 secondary cone pulley pair
6 primary pulley
7 secondary pulley
8 electronic transmission control (EGS)
9 electronic control unit
10 selector lever
11 rotational speed sensor
12 rotational speed sensor
13 main pressure sensor, pressure regulator
14 secondary pulley pressure sensor, pressure regulator
15 signal transmitter
16 main pressure delivery pump
17 oil sump
18 filter

| | |
|---|---|
| A, A', A" | program part for monitoring a pressure buildup |
| B, B', B" | program part for monitoring the secondary pulley pressure |
| C, C', C" | program part for monitoring the main pressure |
| diag_tree_p | position information |
| error 1 | error in buildup of the main pressure |
| error 2 | error in the pressure sensing of the secondary pulley pressure |
| error 3 | error in the pressure sensing of the main pressure |
| F | function |
| hd_reglimit_neg | lower adaptation or regulation limit for adaptation or regulation of the main pressure |
| hd_reglimit_pos | upper adaptation or regulation limit for adaptation or regulation of the main pressure |
| n_mot | rotational speed of the motor |
| n_mot_min1 | applicable threshold value for static rotational speed of the motor |
| p_hd_act | sensed main pressure |
| p_hd_min | threshold value for the main pressure |
| p_hd_nom | nominal value for the main pressure |
| \|p_hd_act-p_hd_nom\| | nominal-actual pressure difference of the main pressure |
| p_s2_act | sensed contact pressure on the secondary pulley, secondary pulley pressure |
| p_s2_min | threshold value for secondary pulley pressure |
| p_s2_nom | nominal value for secondary pulley pressure |
| \|p_s2_act-p_s2_nom\| | nominal-actual pressure differences of the secondary pulley pressure |
| pd_phd_regdiff | applicable threshold value of pressure difference |
| pd_ps2_regdiff | applicable threshold value of pressure difference |
| ps_hddet_max | upper detection limit of the main pressure sensor |
| ps_hddet_min | lower detection limit of the main pressure sensor |
| ps_s2det_max | upper detection limit of the secondary pulley pressure sensor |
| ps_s2det_min | lower detection limit of the secondary pulley pressure sensor |
| S | status |
| s2_reglimit_neg | lower adaptation or regulation limit for adaptation or regulation of the secondary pulley pressure |
| s2_reglimit_pos | upper adaptation or regulation limit for adaptation or regulation of the secondary pulley pressure |
| t_hd_reglimit | applicable time |
| t_phd_regdiff | applicable local filtering time |
| t_ps2_regdiff | applicable local filtering time |
| t_s2_reglimit | applicable time |
| t_delay | delay time for buildup of a substitute function for the main pressure |

What is claimed is:

1. A method for controlling a CVT automatic transmission having a hydraulic system controlling a variator including a cone pulley pair connected by a belt, the method comprising the steps of:

sensing an actual main pressure (p_hd_act) of the hydraulic system actuating the cone pulley pair of the variator;

sensing an actual contact pressure (p_s2_act) on a secondary pulley of the cone pulley pair;

supplying the actual main pressure (p_hd_act) and the actual contact pressure (p_s2_act) to an electronic transmission control;

calculating a nominal-actual pressure difference of the main pressure (|p_hd_act-p_hd_nom|) as the difference between the actual main pressure value (p_hd_act) and a nominal main pressure value (p_hd_nom);

calculating a nominal-actual contact pressure difference (|p_s2_act-p_s2_nom|) as the difference between the actual contact pressure (p_s2_act) on the secondary pulley and a nominal contact pressure value (p_s2_nom) on the secondary pulley;

testing, the plausibility of the actual main pressure (p_hd_act) by comparing the nominal-actual pressure difference of the main pressure (|p_hd_act-p_hd_nom|) to a predetermined main pressure threshold value of pressure difference (pd_phd_regdiff);

testing the plausibility of the actual contact pressure (p_s2_act) by comparing the nominal-actual contact pressure difference (|p_s2_act-p_s2_nom|) to a predetermined contact pressure threshold value of pressure difference (pd_ps2_regdiff);

comparing the actual main pressure (p_hd_act) with a main pressure threshold value (p_hd_min); and comparing the actual contact pressure (p_s2_act) with a contact pressure threshold value (p_s2_min).

2. The method according to claim 1, wherein the testing the plausibility of the actual main pressure and the testing the plausibility of the actual contact pressure are performed simultaneously.

3. The method according to claim 1, wherein the testing the plausibility of the actual main pressure and the testing the plausibility of the actual contact pressure are performed consecutively.

4. The method according to claim 3, wherein the step of testing the actual main pressure (p_hd_act) for plausibility occurs before sensing the actual contact pressure (p_s2_act).

5. The method according to claim 1, further comprising the step of activating a program module leaving function (F10, F12) when a pressure regulation has not been detected to, exist or be admissible for equating the actual contact pressure (p_s2_act) with the nominal contact pressure value (p_s2_nom).

6. The method according to claim 3, further comprising the step of carrying out a test, simultaneously with the consecutive testing of the actual values of the actual main pressure (p_hd_act) and of the actual contact pressure (p_s2_act) as to plausibility, for activation of a pressure regulation for equating the respective pressure values sensed (p_hd_act, p_s2_act) with the associated nominal pressure value (p_hd_nom, p_s2_nom) and admissibility of the pressure regulation.

7. The method according to claim 1, further comprising the step of activating a second program part (B") for testing as to plausibility the actual contact pressure (p_s2_act) when in a summary (F49) of the results of the determination of the actual main pressure (p_hd_act) and of the test simultaneous therewith, the sensing of the actual main pressure (p_hd_act) is detected as being in order.

8. The method according to claim 1, further comprising the steps of determining after a motor start when the CVT automatic transmission has not reached a desired operating pressure, and initiating a determination as to whether the desired operating pressure exists after the motor start activating a function, (F3) to leave a program module upon:

a) detecting when a rotational speed of the motor (n_mot) lies below an applicable threshold value for a static motor rotational speed (n_mot_min 1); or, b) detecting when the rotational speed of the motor (n_mot) lies above the threshold value for the static motor rotational speed (n_mot_min 1) and establishing in a subsequent inquiry (F4) that the actual main pressure (p_hd_act) and the actual contact pressure (p_s2_act) are higher than the respectively associated main pressure and contact pressure threshold values (p_hd_min, p_s2_min).

9. The method for controlling a CVT automatic transmission as set forth in claim 1 further comprising the steps of:

providing an electronic transmission control (8) having an electronic control unit (9) connected with a main pressure sensor (13) and a secondary pulley pressure sensor (14); and providing a program module having a first program part (C, C', C") for determining errors in the sensing of the main pressure (p_hd_act) and providing a second program part (B, B', B") for determining errors in the sensing of the contact pressure (p_s2_act) on the secondary pulley (7) of the CVT automatic transmission (1).

10. A method for controlling a CVT automatic transmission having a hydraulic system controlling a variator including a cone pulley pair connected by a belt, the method comprising the steps of:

sensing an actual main pressure (p_hd_act) of the hydraulic system actuating the cone pulley pair of the variator;

sensing an actual contact pressure (p_s2_act) on a secondary pulley of the cone pulley pair;

supplying the actual main pressure and the actual contact pressure to an electronic transmission control;

determining a main pressure comparison value according to the difference between the actual main pressure value and a nominal main pressure value (|p_hd_act-p_hd_nom|);

determining a contact pressure comparison value according to the difference between the actual contact pressure value and a nominal contact pressure value, (|p_s2_act-p_s2_nom|);

comparing the main pressure comparison value and a predetermined main pressure threshold value (p_hd_min, pd_phd_regdiff);

comparing the contact pressure comparison value and a contact pressure threshold value (p_s2_min, pd_ps2_regdiff);

ensuring the main pressure comparison value and the contact pressure comparison value are within a range of plausible pressure values to determine any error in sensing of the main pressure (p_hd_act) and the contact pressure (p_s2_act) of the moveable pulley (7); and detecting an error (error 2, error 3), during the steps of determining the main and contact comparison values, when one of an upper main pressure regulation, limit and an upper contact pressure regulation limit (hd_reglimit_pos, s2_reglimit_pos) or one of a lower main pressure regulation limit and a lower contact pressure regulation limit (hd_reglimit_neg, s2_reglimit_neg) has been reached and providing an appropriate pressure regulation to the variator to equate the actual main and contact pressure with the respective main and contact nominal pressure.

11. The method according to claim 10, further comprising the step of performing one of the following steps when the error has not been detected:

a) activating a function (F10, F12) for abandoning an activated program, module in case of simultaneous testing of the sensed main pressure (p_hd_act) and contact pressure (p_s2_act) of the secondary pulley (7); and b) branching off testing of the contact pressure (p_s2_act) of the secondary pulley (7) in a case of consecutive testing of the sensed main pressure (p_hd_act) and contact pressure (p_s2_act) of the secondary pulley (7).

12. The method according to claim 11, further comprising the steps of:

consecutively testing for plausibility the actual main pressure (p_hd_act) and the actual contact pressure (p_s2_act_) for plausibility when the CVT automatic transmission is in an operating state; and determining, prior to the consecutive testing of the actual main pressure and actual contact pressure of the secondary pulley (7), whether an error (error 3) in the sensing of the actual main pressure (p_hd_act) has already been stored in an error memory and in case of a positive result of the determination, the sensing of the contact pressure (p_s2_act) of the secondary pulley (7) is started.

13. The method according to claim 12, further comprising the step of starting, prior to activation of a program part (B') for testing the contact pressure (p_s2_act) of the secondary pulley (7), starting a substitute function (F27) for preparing a pressure value of the main pressure.

14. The method according to further comprising the steps of carrying out a test, simultaneously with the consecutive testing of the actual values of the sensed main pressure (p_hd_act) and of the contact pressure (p_s2_act) of the secondary pulley (7) as to plausibility, for activation of a pressure regulation for equating the respective pressure values sensed (p_hd_act, p_s2_act) with the associated nominal pressure value (p_hd_nom, p_s2_nom) and admissibility of the pressure regulation; and determining, prior to the test, whether the respective nominal main and contact pressure values (p_hd_nom, p_s2_nom) are respectively between an upper detection limit (ps_hddet_max, ps_s2det_max) and a lower detection limit (ps_hddet_min, ps_s2det_min) of a respectively associated sensor (13, 14).

15. The method according to claim 13, further comprising the steps of:

carrying out a test, simultaneously with the consecutive testing of the actual values of the sensed main pressure (p_hd_act) and of the contact pressure (p_s2_act) of the secondary pulley (7) as to plausibility, for activation of a pressure regulation for equating the respective pressure values sensed (p_hd_act, p_s2_act) with the associated nominal pressure value (p_hd_nom, p_s2_nom) and admissibility of the pressure regulation;

activating a second program part (B") for testing as to plausibility the actual contact pressure (p_s2_act) when in a summary (F49) of the results of the determination of the sensed main pressure (p_hd_act) and of the test simultaneous therewith, the sensing of the main pressure (p_hd_act) is detected as being in order; and wherein the sensing of the actual main pressure (p_hd_act) is detected as being in order when the main pressure threshold value (pd_phd_regdiff) is not exceeded and main pressure regulation limits (hd_regilimit_pos, hd_reglimit_neg) have not been exceeded and no pressure regulation is active (F49).

16. The method according to claim 13, further comprising the steps of:

carrying out a test, simultaneously with the consecutive testing of the actual values of the sensed main pressure (p_hd_act) and of the contact pressure (p_s2_act) of the secondary pulley (7) as to plausibility, for activation of a pressure regulation for equating the respective pressure values sensed (p_hd_act, ps2_act) with the associated nominal pressure value (p_hd_nom, p_s2_nom) and admissibility of the pressure regulation; and detecting an error (error 3) in the sensing of the actual main pressure (p_hd_act) when one of a main pressure regulation limit (hd_reglimit_pos, hd_reglimit_neg) and the main pressure threshold value (pd_phd_regdiff) has been exceeded (F45, F46, F47).

17. The method according to claim 13, further comprising the steps of:

carrying out a test, simultaneously with the consecutive testing of the actual values of the sensed main pressure (p_hd_act) and of the contact pressure (p_s2_act) of the secondary pulley (7) as to plausibility, for activation of a pressure regulation for equating the respective pressure values sensed (p_hd_act, p_s2_act) with the associated nominal pressure value (p_hd_nom, p_s2_nom) and admissibility of the pressure regulation; and detecting an error (error 2) in the sensing of the actual contact pressure (p_s2_act) of the secondary pulley (7) when one of a regulation limit (s2_reglimit_pos, s2_reglimit_neg) and the contact pressure threshold value (pd_ps2_regdiff) has been exceeded (F62, F63, F64).

18. The method according to claim 14, further comprising the step of abandoning a program module according to a function (F48, F65) having the steps of:

a) testing in a first program part (C") the main pressure (p_hd_act) as to plausibility, no pressure regulation is detected and a detection limit (ps_hddet_min, ps_hddet_max) of the main pressure sensor (13) is exceeded, or b) testing in a second program part (B") the contact pressure (p_s2_act) of the secondary pulley (7) as to plausibility, no pressure adaptation or regulation is detected and the detection limit (ps_s2det_min, ps_s2det_max) of the secondary pressure sensor (14) has been exceeded.

19. The method according to claim 13, further comprising the steps of:

carrying out a test, simultaneously with the consecutive testing of the actual values of the sensed main pressure (p_hd_act) and of the contact pressure (p_s2_act) of the secondary pulley (7) as to plausibility, for activation of a pressure regulation for equating the respective pressure values sensed (p_hd_act, p_s2_act) with the associated nominal pressure value (p_hd_nom, p_s2_nom) and admissibility of the pressure regulation; and determining the sensing of the actual contact pressure (p_s2_act) of the secondary pulley (74 as being in order when the contact pressure threshold value (pd_ps2_regdiff) has not been exceeded and a contact pressure regulation limit (s2_reglimit_pos, s2_reglimit_neg) has not been exceeded or no pressure regulation is active (F66).

20. The method according to claim 13, further comprising the steps of:

carrying out a test, simultaneously with the consecutive testing of the actual values of the sensed main pressure (p_hd_act) and of the contact pressure (p_s2_act) of the secondary pulley (7) as to plausibility, for activation of a pressure regulation for equating the respective pressure values sensed (p_hd_act, p_s2_act) with the associated nominal pressure value (p_hd_nom, p_s2_nom) and admissibility of the pressure regulation; and detecting an error (error 3) in the sensing of the main pressure (p_hd_act), prior to activation of a program part (B") for testing the contact pressure (p_s2_act) of the secondary pulley (7), and starting a time delay (t_delay) for preparing the main pressure threshold value, in a substitute function (F50).

21. The method according to claim 10, further comprising the steps of:

determining after a motor start when the CVT automatic transmission has not reached a desired operating pressure, and initiating a determination as to whether the desired operating pressure exists after the motor (start; and determining an error (error 1) in the buildup of the main pressure (p_hd_act) after a motor start is detected when the motor rotational speed (n_mot) is above the threshold value for a static motor rotational speed (n_mot_min 1) and in a subsequent inquiry (F4), establishing that the actual main pressure (p_hd_act) or the actual contact pressure (p_s2_act) on the secondary pulley (7) is lower than the respectively associated main pressure and contact pressure threshold values (p_hd_min, p_s2_min).

22. A method for controlling a CVT automatic transmission having a hydraulic system controlling a variator including a cone pulley pair connected by a belt, the method comprising the steps of:

sensing an actual main pressure (p_hd_act) of the hydraulic system actuating the cone pulley pair of the variator;

sensing an actual contact pressure (p_s2_act) on a secondary pulley of the cone pulley pair;

supplying the actual main pressure and the actual contact pressure to an electronic transmission control;

determining a main pressure comparison value according to the difference between the actual main pressure value and a nominal main pressure value (|p_hd act-p_hd_nom|);

determining a contact pressure comparison value according to the difference between the actual contact pressure value and a nominal contact pressure value, (|p_s2_act-p_s2_nom|);

comparing the main pressure comparison value and a predetermined main pressure threshold value (p_hd_min, pd_phd_regdiff);

comparing the contact pressure comparison value and a contact pressure threshold value (p_s2_min, pd_ps2_regdiff);

ensuring the main pressure comparison value and the contact pressure comparison value are within a range of plausible pressure values to determine any error in sensing of the main pressure (p_hd_act) and the contact pressure (p_s2_act) of the moveable pulley (7); and generating an error (error 2, error 3) when at least one of the main pressure comparison value (|p_hd_act-p_hd nom|) and the contact pressure comparison value (|p_s2_act-p_s2_nom|) exceeds the associated threshold value (pd_phd_regdiff, pd_ps2_regdiff).

23. A method for controlling a CVT automatic transmission having a hydraulic system controlling a variator including a cone pulley pair connected by a belt, the method comprising the steps of:

sensing an actual main pressure (p_hd_act) of the hydraulic system actuating the cone pulley pair of the variator;

sensing an actual contact pressure (p_s2_act) on a secondary pulley of the cone pulley pair;

supplying the actual main pressure and the actual contact pressure to an electronic transmission control;

determining a main pressure comparison value according to the difference between the actual main pressure value and a nominal main pressure value (|p_hd_act-p_hd_nom|);

determining a contact pressure comparison value according to the difference between the actual contact pressure value and a nominal contact pressure value, (|p_s2_act-p_s2 nom|);

comparing the main pressure comparison value and a predetermined main pressure threshold value (p_hd_min, pd_phd_regdiff);

comparing the contact pressure comparison value and a contact pressure threshold value (p_s2_min, pd_ps2_regdiff);

ensuring the main pressure comparison value and the contact pressure comparison value are within a range of plausible pressure values to determine any error in sensing of the main pressure (p_hd_act) and the contact pressure (p_s2_act) of the moveable pulley (7); and determining after a motor start when the CVT automatic transmission has not reached a desired operating pressure, and initiating a determination as to whether the desired operating pressure exists after the motor start.

* * * * *